United States Patent
Wang et al.

(10) Patent No.: US 6,623,788 B1
(45) Date of Patent: Sep. 23, 2003

(54) DEFECT-FREE PATTERNING OF SOL-GEL-COATED SUBSTRATES FOR MAGNETIC RECORDING MEDIA

(75) Inventors: Hong Ying Wang, Fremont, CA (US); Neil Deeman, Alamo, CA (US); Gene Gauzner, Livermore, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 231 days.

(21) Appl. No.: 09/852,084

(22) Filed: May 10, 2001

Related U.S. Application Data

(60) Provisional application No. 60/221,219, filed on Jul. 25, 2000, and provisional application No. 60/221,460, filed on Jul. 25, 2000.

(51) Int. Cl.[7] ............................................. B05D 5/12
(52) U.S. Cl. .................. 427/130; 427/131; 427/261; 427/264; 427/265; 427/266; 427/269; 427/270; 427/271; 427/279; 427/287; 427/331; 427/356; 427/358; 427/385.5; 427/397.7; 427/404; 427/407.1; 427/407.2
(58) Field of Search ............................... 427/130–132, 427/261, 264, 265, 266, 269, 270, 271, 279, 287, 331, 356, 358, 385.5, 397.7, 404, 407.1, 407.2

(56) References Cited

U.S. PATENT DOCUMENTS

| | | |
|---|---|---|
| 4,262,875 A | 4/1981 | Nyman et al. |
| 4,430,401 A | 2/1984 | Wilkinson |
| 4,522,659 A | 6/1985 | Prusak |
| 4,539,079 A | 9/1985 | Okabayashi |
| 4,723,903 A | 2/1988 | Okazaki et al. |
| 4,953,385 A | 9/1990 | Aoki et al. |
| 5,048,745 A | 9/1991 | Sato et al. |
| 5,310,333 A | 5/1994 | Sato et al. |
| 5,480,596 A | 1/1996 | Okubo et al. |
| 5,503,963 A | 4/1996 | Bifano |
| 5,669,979 A | 9/1997 | Elliott et al. |
| 5,723,033 A | 3/1998 | Weiss |
| 5,756,130 A | 5/1998 | Umebayashi et al. |
| 5,861,113 A | 1/1999 | Choquette et al. |
| 6,086,961 A | 7/2000 | Bonyhard |

OTHER PUBLICATIONS

R.L. Roncone, et al., "*Embossed Gratings In Sol–Gel Waveguides: Pre–Emboss Heat Treatment Effects*" Elsevier Science Publishers, B.V. (North Holland), 1991, pp. 111–117 (No month avail.).

Ramon, et al, "*Embossable Grating Couplers for Planar Waveguide Optical Sensors*" Analytical Chemistry, vol. 68, No. 7, Apr. 1, 1996, pp. 1245–1249.

Lukosz, et al, Embossing Technique for Fabricating Integrated Optical Components in hard Inorganic Waveguiding Materials Optics Letters, Oct. 1983, vol. 8, No. 10, pp. 537–539.

Christensen, et al, "*Comparison Of Robust Coupling Techniques For Planar Waveguide Immunosensors*"SPIE, vol. 1796, 1992, pp. 20–25 (No month avail.).

*Primary Examiner*—Bernard Pianalto
(74) *Attorney, Agent, or Firm*—McDermott, Will & Emery

(57) ABSTRACT

A method of manufacturing a magnetic recording medium comprises steps of providing a non-magnetic substrate for a magnetic recording medium, the substrate including at least one major surface; forming a layer of a sol-gel on the at least one major surface; forming a pattern, e.g., a servo pattern in an exposed surface of the layer of said sol-gel; and converting the layer of sol-gel to a glass or glass-like layer while preserving the pattern in an exposed surface of said glass or glass-like layer. Embodiments of the invention include magnetic media including a patterned glass or glass-like layer formed from a layer of a hydrophilic sol-gel with the pattern embossed therein by means of a stamper having a hydrophilic surface including a negative image of the pattern.

12 Claims, 1 Drawing Sheet

DEFECT-FREE PATTERNING OF SOL-GEL-COATED SUBSTRATES FOR MAGNETIC RECORDING MEDIA

CROSS-REFERENCE TO PROVISIONAL APPLICATIONS

This application claims priority from U.S. provisional patent application Serial Nos. 60/221,219 and 60/221,460, each filed Jul. 25, 2000, the entire disclosures of which are incorporated herein by reference.

FIELD OF THE INVENTION

The present invention relates to methods and apparatus for forming servo patterns in substrates for magnetic recording media utilized in high areal, high track density applications, and to magnetic recording media produced thereby. The invention has particular utility in the manufacture of magnetic data/information storage and retrieval media, e.g., hard disks, utilizing very hard surfaced, high modulus substrates such as of glass, ceramic, and glass-ceramic materials.

BACKGROUND OF THE INVENTION

Magnetic recording media are widely used in various applications, particularly in the computer industry. A portion of a conventional recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 can be locally magnetized by a write transducer or write head, to record and store data/information. The write transducer creates a highly concentrated magnetic field which alternates direction based on the bits of information being stored. When the local magnetic field produced by the write transducer is greater than the coercivity of the recording medium layer 13, then the grains of the polycrystalline medium at that location are magnetized. The grains retain their magnetization after the magnetic field produced by the write transducer is removed. The direction of the magnetization matches the direction of the applied magnetic field. The pattern of magnetization of the recording medium can subsequently produce an electrical response in a read transducer, allowing the stored medium to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head(s) as close to the associated recording surface(s) as is possible, i.e., to minimize the "flying height" of the head(s). Thus a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

Disk drives typically comprise a magnetic head assembly mounted on the end of a support or actuator arm which positions the head radially over the disk surface. If the actuator arm is held stationary, the magnetic head assembly will pass over a circular path on the disk surface known as a track, and information can be read from or written to that track. Each concentric track has a unique radius, and reading and writing information from or to a specific track requires the magnetic head to be located above the track. By moving the actuator arm, the magnetic head assembly is moved radially over the disk surface between tracks.

The disk drive must be able to differentiate between tracks on the disk and to center the magnetic head over any particular track. Most disk drives use embedded "servo patterns" of magnetically recorded information on the disk. The servo patterns are read by the magnetic head assembly to inform the disk drive of the track location. Tracks typically include both data sectors and servo patterns. Each data sector contains a header followed by a data section. The header may include synchronization information to synchronize various timers in the disk drive to the speed of disk rotation, while the data section is used for recording data. Typical servo patterns are described in, for example, U.S. Pat. No. 6,086,961, the disclosure of which is incorporated herein by reference.

Servo patterns are usually written on the disk during manufacture of the disk drive, after the drive is assembled and operational. The servo pattern information, and particularly the track spacing and centering information, needs to be located very precisely on the disk surface. However, at the time the servo patterns are written, there are no reference locations on the disk surface which can be perceived by the disk drive. Accordingly, a highly specialized device known as a "servo-writer" is used during writing of the servo-patterns. Largely because of the locational precision needed, servo-writers are expensive, and servo-writing is a time-consuming process.

One approach (i.e., "PERM" disks, manufactured by Sony Corp.) to avoid traditional servo-writing has been to injection mold or stamp servo patterns on a polymer-based substrate disk. A constant thickness layer of magnetic recording material is then applied over the entire disk surface, including the depressions and protrusions of the servo patterns. After all of the constituent layers of the medium have been applied to the disk, a magnetic bias is recorded on the servo patterns. For example, a first magnetic field may magnetically initialize the entire disk at a one setting. Then a second magnetic field, located at the surface of the disk and e.g., provided by the magnetic head of the disk drive, is used to magnetize the protruding portions of the servo patterns relative to the depressions. Because the protrusions are closer than the depressions to the magnetic initialization, the magnetization carried by the protrusions may be different than the magnetization carried by the depressions. When read, the resulting disk servo patterns show magnetic transitions between the depressions and the protrusions.

Meanwhile, the continuing trend toward manufacture of very high areal density magnetic recording media at reduced cost provides impetus for the development of lower cost materials, e.g., polymers, glass, ceramics, and glass-ceramics composites as replacements for the conventional Al alloy-based substrates for magnetic disk media. However, poor mechanical and tribological performance, track mis-registration ("TMR"), and poor flyability have been particularly problematic in the case of polymer-based substrates fabricated as to essentially copy or mimic conventional hard disk design features and criteria. On the other hand, glass, ceramic, or glass-ceramic materials are attractive candidates for use as substrates for very high areal density disk recording media because of the requirements for high performance of the anisotropic thin film media and high modulus of the substrate. However, the extreme difficulties encountered with grinding and lapping of glass, ceramic, and glass-ceramic composite materials have limited their use to only higher cost applications such as mobile disk drives for "notebook"-type computers.

Presently, media anisotropy is achieved by circumferentially polishing ("mechanically texturing") Al alloy substrates with NiP plating layers using a diamond or other relatively hard abrasive in slurry form dispensed on an absorbent and compliant polishing pad or tape. Sub-micron flyability (e.g., <0.5 $\mu$inch) of the recording transducer or head over a is a requirement for obtainment of very high areal density recording media. However, attempts to achieve the requisite surface topography on glass, ceramic, or glass-ceramic composite substrates have been unsuccessful due to their extreme hardness (e.g., glass substrates have a Knoop hardness greater than about 760 $kg/mm^2$ compared with about 550 $kg/mm^2$ for Al alloy substrates with NiP plating layers). In addition, the low flowability and extreme hardness of these substrate materials effectively precludes formation of servo patterns in the surfaces thereof by injection molding or stamping, as has been performed with polymer-based substrates.

In view of the above, there exists a need for improved methodology and means for providing disk substrates for magnetic recording media, which substrates are constituted of very hard materials, with at least one surface of requisite topography for enabling operation with flying head read/write transducers/heads operating at very low flying heights and with servo patterns provided therein, as by embossing. More specifically, there exists a need for an improved means and methodology for embossing a pattern, i.e., a servo pattern, in a surface of a substrate for a magnetic recording medium, comprised of a glass, ceramic, or glass-ceramic composite material. In addition, there exists a need for an improved, high areal density magnetic recording medium including a high hardness, high modulus substrate having a servo pattern integrally formed therewith, as by embossing.

The present invention addresses and solves problems and difficulties attendant upon the use of very hard materials, e.g., of glass, ceramic, or glass-ceramic, as substrate materials in the manufacture of very high areal density magnetic recording media, while maintaining full capability with substantially all aspects of conventional automated manufacturing technology for the fabrication of thin-film magnetic media. Further, the methodology and means afforded by the present invention enjoy diverse utility in the manufacture of various other devices and media requiring formation of patterned surfaces by embossing of high hardness materials.

DISCLOSURE OF THE INVENTION

An advantage of the present invention is an improved method of manufacturing a magnetic recording medium including a patterned surface.

Another advantage of the present invention is an improved method of manufacturing a magnetic recording medium including a high modulus substrate having a servo-patterned glass or glass-like layer formed on a surface thereof.

Yet another advantage of the present invention is an improved magnetic recording medium including an embossed servo pattern formed therein and capable of operation with transducer heads at sub-micron flying heights.

Still another advantage of the present invention is an improved magnetic recording medium comprised of a high modulus substrate including a sintered glass or glass-like layer formed thereon and having a servo pattern formed therein.

A further advantage of the present invention is a stamper having a hydrophobic surface for embossing a servo pattern in the surface of a hydrophilic sol-gel layer formed on a surface of a high modulus substrate for a magnetic recording medium.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a magnetic recording medium, comprising the sequential steps of:

(a) providing a non-magnetic substrate for a magnetic recording medium, the substrate including at least one major surface;

(b) forming a layer of a sol-gel on the at least one major surface of the substrate;

(c) forming a pattern in an exposed surface of the layer of the sol-gel; and (d) converting the layer of the sol-gel to a glass or glass-like layer while preserving the pattern in an exposed surface of the glass layer.

According to embodiments of the present invention, step (a) comprises providing a disk-shaped, high modulus substrate having a pair of major surfaces and comprised of a glass, ceramic, or glass-ceramic material; step (b) comprises forming the layer of the sol-gel by spin coating a solution of the sol-gel on the at least one major surface of the substrate; and step (c) comprises embossing a servo pattern in the exposed surface of the layer of the sol-gel by applying thereto a surface of a stamper, the surface of the stamper including a negative image pattern of the servo pattern.

In accordance with embodiments of the present invention, step (b) comprises forming a layer of a hydrophilic sol-gel on the at least one major surface of the substrate; and step (c) comprises embossing utilizing a stamper wherein at least the patterned surface thereof is formed of a hydrophobic material.

According to particular embodiments of the invention, step (c) comprises utilizing a stamper wherein at least the patterned surface thereof is formed of a hydrophobic polymeric material; e.g., an amorphous thermoplastic material selected from polycarbonates, polyetherimides, polypropylenes, and polyethylenes; or step (c) comprises utilizing a stamper having a main body comprised of a first metal and the patterned surface thereof is formed of a second metal, carbon (C), or a hydrophobic polymer e.g., the main body is comprised of nickel (Ni) and the patterned surface thereof is formed of platinum (Pt), carbon (C), or a sputtered hydrophobic polymer.

In accordance with embodiments of the present invention, step (d) comprises sintering the layer of sol-gel at an elevated temperature; and step (b) comprises forming a layer of a sol-gel comprising a porous layer of $SiO_2$ containing water and at least one solvent in the pores thereof, wherein step (d) comprises converting the layer of sol-gel to the glass or glass-like layer by driving out the water and the at least one solvent from the pores by sintering the layer of sol-gel at a temperature of from about 300 to above about 1000° C.

According to embodiments of the present invention, the method further comprises the step of:

(e) forming a stack of thin film layers over the exposed surface of the glass or glass-like layer, the stack of layers including at least one ferromagnetic layer.

Another aspect of the present invention is a magnetic recording medium, comprising:

(a) a non-magnetic substrate having at least one major surface;

(b) a sintered glass or glass-like layer formed on the at least one major surface, the sintered glass or glass-like layer including an upper surface having an embossed pattern formed therein; and (c) a stack of thin film layers formed over the upper surface of the sintered glass or glass-like layer, the stack of layers including at least one ferromagnetic layer.

In accordance with embodiments of the present invention, the non-magnetic substrate (a) is disk-shaped with a pair of major surfaces and comprised of a high modulus material selected from glass, ceramic, and glass-ceramic materials; and the sintered glass or glass-like layer (b) is derived from a sol-gel layer and includes an embossed servo pattern formed therein.

Yet another aspect of the present invention is a stamper for embossing a servo pattern in a surface of a layer of a hydrophilic sol-gel formed on a surface of a substrate for a magnetic recording medium, comprising:

(a) a main body having an embossing surface including a negative image of the servo pattern; and (b) means for facilitating release of the embossing surface of the stamper from the surface of the layer of sol-gel subsequent to embossing of the servo pattern.

According to particular embodiments of the present invention, the main body and the embossing surface of the stamper are formed of a hydrophobic polymeric material, e.g., an amorphous thermoplastic material selected from polycarbonates, polyetherimides, polypropylenes, and polyethylenes; whereas, according to other particular embodiments of the present invention, the main body is formed of a first metal and the embossing surface is formed of a second metal, carbon, or a hydrophobic polymer, e.g., the first metal is nickel and the embossing surface is made of platinum, carbon, or a sputtered hydrophobic polymer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWING

The following detailed description of the embodiments of the present invention can best be understood when read in conjunction with the following drawing, in which the features are not necessarily drawn to scale but rather are drawn as to best illustrate the pertinent features, wherein:

The FIGURE illustrates, in schematic, simplified cross-sectional view, a portion of a thin film magnetic data/information recording/storage medium.

DESCRIPTION OF THE INVENTION

Figure 1:
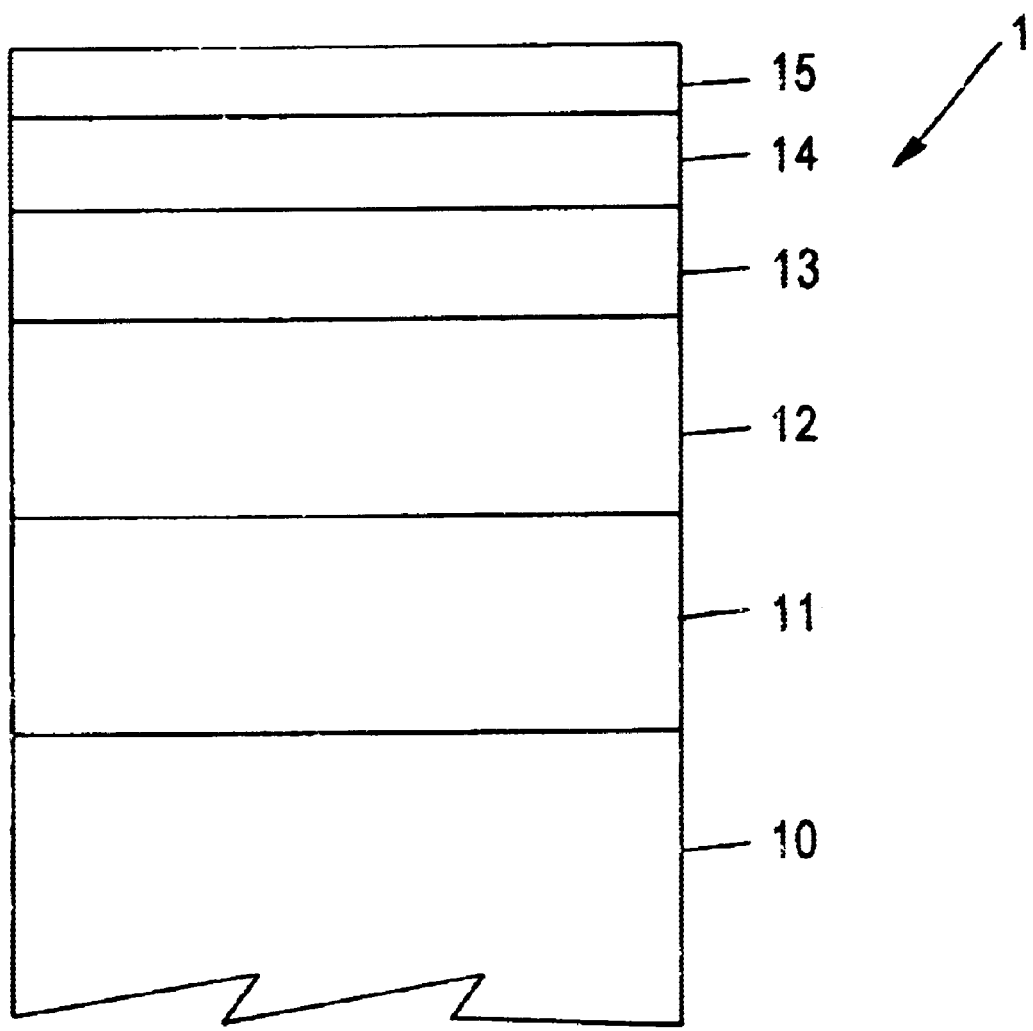

The present invention addresses and solves problems attendant upon the use of very hard surfaced, high modulus materials, e.g., of glass, ceramics, or glass-ceramic composites, as substrates in the manufacture of thin film, high areal density magnetic recording media, and is based upon the discovery that the surfaces of such materials may be modified, i.e., reduced in hardness, so as to facilitate formation of servo patterns therein, as by a simple and conveniently performed embossing process. According to the invention, modification (i.e., reduction) of surface hardness of high modulus substrates for use in the manufacture of thin film magnetic recording media is obtained by first forming a relatively soft coating layer on the substrate surface, embossing the desired servo pattern in the exposed upper surface of the relatively soft coating layer, and then converting the relatively soft layer to a relatively hard layer while retaining the embossed servo pattern therein. The thus-formed substrate with embossed servo pattern in the exposed surface thereof is then subjected to thin film deposition thereon for forming the layer stack constituting the magnetic recording medium. The inventive methodology advantageously provides servo-patterned magnetic recording media without requiring servo-writing subsequent to media fabrication.

More specifically, according to the present invention, a relatively soft layer of a sol-gel is initially formed on the surface of the high modulus glass, ceramic, or glass-ceramic composite substrate, e.g., in disk form. By way of illustration, but not limitation, a sol-gel layer having a thickness of from about 0.2 to about 1 $\mu$m may be formed on the substrate surface by any convenient technique, e.g., spin coating of a solution of the sol-gel. A suitable sol-gel solution for use according to the invention may be prepared by mixing an alkoxide, e.g., a silicon alkoxide such as tetraethoxysilane ("TEOS") or tetramethoxysilane ("TMOS"), water, and nitric acid at molar ratios of TEOS or TMOS/$H_2O$/$HNO_3$ of 1/4–30/>0.05. The nitric acid acts as a catalyst for conversion of the TEOS or TMOS to a $SiO_2$ sol according to the following reaction, illustratively shown for TEOS:

$$nSi(OC_2H_5)_4 + 2nH_2O \rightarrow nSiO_2 + 4nC_2H_5OH$$

with ethanol ($C_2H_5OH$) being produced as a reaction product in solution. After completion of reaction, butanol ($C_4H_9OH$) is added to the solution as a drying retardation agent at molar ratios of TEOS/$H_2O$/$HNO_3$/$C_4H_9OH$ of e.g., 1/5/0.05/>4. Such solution, when applied to the substrate surface as by spin coating, forms a very smooth film with a minimum amount of surface microwaves. The resultant film or layer is glass-like, principally comprised of silica ($SiO_2$) molecular clusters together with the various solvents ($H_2O$, $C_2H_5OH$, $C_4H_9OH$), and adheres well to the substrate surface. The sol-gel film or layer is of a porous structure with the solvents saturated in the micropores thereof.

According to the inventive methodology, the as-deposited, relatively soft sol-gel film or layer applied to the hard-surfaced substrate is then subjected to an embossing process for forming a servo pattern in the surface thereof, comprising a patterned plurality of depressions and protrusions, e.g., by utilizing a stamper having a negative image of the desired servo pattern or an equivalently performing device. The exposed, upper surface of the relatively soft sol-gel layer may also be subjected to mechanical texturing (after drying in air but prior to sintering), e.g., as by a standard NiP texturing process utilizing an abrasive size of about 0.25 $\mu$m, in order to enable formation of oriented media critical for achieving high areal density recording.

Subsequent to servo pattern formation (and mechanical texturing, if desired) of the as-deposited, relatively soft sol-gel film or layer, a sintering process is performed at an elevated temperature of from about 300 to above about 1000° C. (depending upon the withstand temperature of the substrate material, i.e., which temperature is higher for ceramic-based substrates than for glass-based substrates) at e.g., a ramping rate from about 0.5 to about 10 ° C./min. and a dwell time of about 2 hrs., to evaporate the solvents so as to effect at least partial collapse of the micro-pores, with resultant densification of the sol-gel film or layer into a substantially fully densified glass layer having a density and hardness approaching that of typical silica glass (<1.5 g/cm$^3$), or into a partially densified "glass-like" layer. The embossed servo pattern (and mechanical texturing) formed in the exposed upper surface of the relatively soft sol-gel layer is preserved in the corresponding exposed upper surface of the sintered glass or glass-like layer. Formation of thin film magnetic media on the thus-formed glass-coated, servo patterned/mechanically textured substrates is accomplished utilizing conventional thin film deposition techniques, e.g., sputtering, for forming the layer stack comprising a polycrystalline underlayer, magnetic layer, and protective overcoat layer.

As indicated above, according to the invention, the step of forming the servo pattern in the exposed, upper surface of the relatively soft sol-gel film or layer by embossing is typically performed with a stamper (or equivalently performing device) having a negative image of the desired servo pattern. Clean release of the stamper from the sol-gel film or layer without sticking is critical for obtaining defect-free servo-patterned surfaces. However, experimentation by the inventors determined that stampers fabricated of nickel (Ni) such as are employed in the manufacture of compact discs (CDs) for plastic molding/pattern formation, tend to adhere to the surface of the sol-gel film or layer, resulting in surface defects arising from the pulling away or severing of portions of the sol-gel layer from the underlying substrate surface. The inventors have determined that, for satisfactory, or "clean" release of the stamper from the sol-gel layer surface to occur, the patterned surface of the stamper must be sufficiently different from that of the sol-gel. In particular, the inventors determined that the sol-gel has a hydrophilic surface, and therefore the stamper must have a hydrophobic surface in order to facilitate clean release or separation.

According to a first approach developed by the inventors, the stamper was fabricated from polymeric materials, via injection molding utilizing a Ni "mother" stamper having a servo pattern comprised of a plurality of pits to form a polymeric "child" stamper having a servo pattern comprised of a corresponding plurality of protrusions. However, the high viscosity of the polymer melt imposed a great challenge in filling the sub-micron dimensioned pits to produce correspondingly dimensioned protrusions on the polymeric stamper with a high degree of reproduction fidelity. Polymer-based stampers with high reproduction fidelity protrusions suitable for use in the servo-patterning process of the invention were successfully obtained by utilizing a very high mold temperature, i.e., close to the $T_g$ of the polymeric material, where $T_g$ is the critical temperature separating glassy behavior of the polymeric material from rubbery behavior, with $T_g$ typically being from about 85 to about 285 ° C. for most engineering plastics, e.g., about 150 ° C for polycarbonate and about 217 ° C. for polyetherimide, very high injection rates (e.g., from about 170 to about 190 cm$^3$/sec.), and high melt temperature to enhance melt flow in the mold, e.g., about 380–385° C. for polyetherimide.

Satisfactory polymer-based stampers for use according to the servo-patterning process of the invention were obtained with several amorphous thermoplastics, notably polycarbonates (PCs) and polyetherimides (PEIs). PEI-based stampers were determined to be superior to those based upon PC in view of their better chemical resistance against the alcohols present in the as-deposited film or layer of sol-gel and their better mechanical performance. However, PEI-type polymeric materials are more difficult to mold than PC-type polymeric materials because of their high $T_g$ and poor melt flow characteristics. PEI-based stampers provided clean release from the sol-gel after servo pattern stamping, enabling formation of servo-patterned sol-gel disks operable at flying heights of about 0.5 $\mu$ inch.

According to a second approach developed by the inventors, the surface characteristics of a metal-based (e.g., Ni) stamper were modified to facilitate a clean release from the sol-gel film or layer. The surface of a Ni-based stamper was modified by sputtering an about 500 to about 1,000 Å thick layer of a material, such as, for example, platinum (Pt), carbon (C), or a polymeric material, which materials are characterized by having a low surface energy and hydrophobic surface characteristics. In particular, Pt has been found to provide excellent results when coated on the patterned surface of a Ni-based stamper, because it is durable (thus allowing the stamper to be re-used a number of times), very inert, and its hydrophobic characteristics are enhanced by exposure to the ambient. Delamination of the Pt film from the Ni stamper surface due to contamination of the surface by organics can be effectively prevented by subjecting the Ni surface to cleaning in an oxygen ($O_2$) plasma or by reactive ion etching prior to sputter deposition of the Pt film. Further, according to a particularly advantageous method, the sputtering step can be incorporated into the stamper fabrication process as to eliminate any problems with adhesion. According to this method, the Pt layer is sputtered onto the patterned surface of a Ni-based mother stamper and a Ni-based child stamper then formed over the Pt layer on the mother stamper, as by electroforming. In this way, the child stamper is formed on the Pt layer, and after the child stamper is separated from the mother stamper, a Ni-based stamper with a Pt layer on the surface thereof is obtained.

Thus, the present invention advantageously provides, as by processing techniques and methodologies, including embossing of sol-gel layers, which can be practiced at low cost to yield improved, servo-patterned substrates comprised of high hardness, high modulus materials suitable for the manufacture of high areal recording density magnetic recording media, magnetic recording media including such improved, servo-patterned substrates, and improved stampers for performing the embossing.

In the previous description, numerous specific details are set forth, such as specific materials, structures, reactants, processes, etc., in order to provide a better understanding of the present invention. However, the present invention can be practiced without resorting to the details specifically set forth. In other instances well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of manufacturing a magnetic recording medium, comprising the sequential steps of:

(a) providing a non-magnetic substrate for a magnetic recording medium, said substrate including at least one major surface;

(b) forming a layer of a sol-gel on said at least one major surface of said substrate;

(c) forming a servo pattern in an exposed surface of said layer of said sol-gel; and (d) converting said layer of said sol-gel to a glass or glass-like layer while preserving said servo pattern in said exposed surface of said glass or glass-like layer.

2. The method according to claim 1, wherein:

step (a) comprises providing a disk-shaped, high modulus substrate having a pair of major surfaces and comprised of a glass, ceramic, or glass-ceramic material.

3. The method according to claim 1, wherein:

step (b) comprises forming said layer of said sol-gel by spin coating a solution of said sol-gel on said at least one major surface of said substrate.

4. The method according to claim 1, wherein:

step (c) comprises embossing said servo pattern in said exposed surface of said layer of said sol-gel by applying thereto a surface of a stamper, said surface of said stamper including a negative image pattern of said servo pattern.

5. The method according to claim 4, wherein:

step (b) comprises forming a layer of a hydrophilic sol-gel on said at least one major surface of said substrate; and step (c) comprises embossing utilizing a stamper wherein at least said patterned surface thereof is formed of a hydrophobic material.

6. The method according to claim 5, wherein:

step (c) comprises utilizing a stamper wherein at least said patterned surface thereof is formed of a hydrophobic polymeric material.

7. The method according to claim 6, wherein:

step (c) comprises utilizing a stamper wherein said hydrophobic polymeric material is an amorphous thermoplastic material.

8. The method according to claim 5, wherein:

step (c) comprises utilizing a stamper having a main body comprised of a first metal and said patterned surface thereof is formed of a second metal, carbon, or a hydrophobic polymer.

9. The method according to claim 8, wherein:

step (c) comprises utilizing a stamper wherein said main body is comprised of nickel and said patterned surface thereof is formed of platinum, carbon, or a sputtered hydrophobic polymer.

10. The method according to claim 1, wherein:

step (d) comprises sintering said layer of sol-gel at an elevated temperature.

11. The method according to claim 10, wherein:

step (b) comprises forming a layer of a sol-gel comprising a porous layer of $SiO_2$ containing water and at least one solvent in the pores thereof; and step (d) comprises converting said layer of sol-gel to said glass or glass-like layer by driving out said water and said at least one solvent from said pores by sintering said layer of sol-gel at a temperature of from about 300 to above about 1000° C.

12. The method according to claim 1, further comprising the step of:

(e) forming a stack of thin film layers over said exposed surface of said glass or glass-like layer, said stack of layers including at least one ferromagnetic layer.

* * * * *